(12) United States Patent
Dasylva et al.

(10) Patent No.: US 6,710,913 B1
(45) Date of Patent: Mar. 23, 2004

(54) TECHNIQUE AND APPARATUS FOR WAVE-MIXING FREQUENCY TRANSLATION IN A NETWORK

(75) Inventors: Abel C. Dasylva, Ottawa (CA); Delfin Y. Montuno, Kanata (CA); Prasad Kodaypak, Nepean (CA); Pia Sindile, Ottawa (CA); Zhonghui Yao, Kanata (CA)

(73) Assignee: Nortel Networks Limited, Quebec (CA)

( * ) Notice: Subject to any disclaimer, the term of this patent is extended or adjusted under 35 U.S.C. 154(b) by 0 days.

(21) Appl. No.: 10/326,125

(22) Filed: Dec. 23, 2002

(51) Int. Cl.[7] .............................. G02F 2/02; G02B 6/35; G02B 6/28

(52) U.S. Cl. ............................ 359/326; 385/16; 385/24

(58) Field of Search ................................. 359/326–332; 385/16–24

(56) References Cited

U.S. PATENT DOCUMENTS

| | | | |
|---|---|---|---|
| 5,825,517 A | 10/1998 | Antoniades et al. | ........ 359/117 |
| 2002/0118415 A1 | * 8/2002 | Dasylva et al. | ............. 359/124 |

OTHER PUBLICATIONS

Achille Pattavina, Switching Theory Architecture and Performance in Broadband ATM Networks, Sections 2.3.1, 3.2, and 4.2, 1998.

Byrav Ramamurthy, Wavelength Conversion in WDM Networking, IEEE Journal on Selected Areas in Communications, Sep. 1998, vol. 16., No. 7, pp. 1061–1073.

S. J. B. Yoo, Wavelength Conversion Technologies for WDM Network Applications, Journal of Lightwave Technology, Jun. 1996, vol. 14, No. 6, pp. 955–966.

N. Antoniades, An Architecture for a Wavelength–Interchanging Cross–Connect Utilizing Parametric Wavelength Coverters, Journal of Lightwave Technology, Jul. 1999, vol. 17, No. 7, pp. 1113–1125.

Dong–Jye Shyy, $Log_2$ (N,m,p) Strictly Nonblocking Networks, IEEE Transactions on Communications, Oct. 1991, vol. 39, No. 10, pp. 1502–1510.

Chin–Tau Lea, Tradeoff of Horizontal Decomposition Versus Vertical Stacking in Rearrangeable Nonblocking Networks, Jun. 1991, IEEE Transactions on Communications, vol. 39, No. 6, pp. 899–904.

W. Kabacinski, et al., Wide–Sense Non–blocking Multi–$Log_2$ N Broadcast Switching Networks, 2000, IEEE, pp. 1440–1444.

(List continued on next page.)

*Primary Examiner*—John D. Lee
(74) *Attorney, Agent, or Firm*—Hunton & Williams LLP

(57) ABSTRACT

A technique for wave-mixing frequency translation is disclosed. In one particular exemplary embodiment, the technique may be realized as a general construction for multi-log wave-mixing unicast or multicast cross-connects, with b×b space-switching elements, where $b \geq 2$. The resulting cross-connects support all-optical frequency-conversion, and they exploit multi-stage wave-mixing bulk frequency-translation In these cross-connects, for any light-path the worst case number of cascaded frequency-conversions is $O(\log_b W)$, where W is the number of wavelengths per fiber. The wavelength-converter requirements are of between O(F) and $O(F \log_b W)$, per stage and per plane, where F is the number of fibers.

8 Claims, 2 Drawing Sheets

OTHER PUBLICATIONS

Chin–Tau Lea, Bipartite Graph Design Principle for Photonic Switching Systems, IEEE Transactions on Communications, Apr. 1990, vol. 38, No. 4, pp. 529–538.

M. H. Chou, et al., 1.5 um–band wavelength conversion based on difference–frequency generation in $LiNbO_3$ waveguides with integrated coupling structures, Optics Letters, Jul. 1, 1998, vol. 23, No. 13, pp. 1004–1006.

M. H. Chou et al, Multiple–channel wavelength conversion by use of engineered quasi–phase–matching structures in $LiNbO_3$ waveguides. Optics Letters, Aug. 15, 1999, vol. 24, No. 16, pp. 1157–1159.

M.–S. Chou, et al., Optical frequency mixers for WDM and TDM applications, pp. 16–18, [No journal name or date].

Kou–Chun Lee, et al., Optimization of a WDM Optical Packet Switch with Wavelength Converters[1], 1995 IEEE, pp. 423–430.

Chin–Tau Lea, Crossover Minimization in Directional–Coupler–Based Photonic Switching Systems, IEEE Transactions on Communications, Mar. 1988, vol. 36, No. 3, pp. 355–363.

F. K. Hwang, Choosing the Best logk(N, m, P) Strictly Nonblocking Networks, IEEE Transactions On Communications, vol. 46, No. 4, Apr. 1998, pp. 454–455.

A. Dasylva et al., B–ary Twisted Benes Networks, Nortel Networks, Feb. 26, 2002, pp. 1–4.

A. Dasylva et al, Logb(N, m, p) Wavelength–Interchanging Cross–Connects with Wave–Mixing Frequency–Translation, Nortel Networks, Sep. 12, 2002, pp. 1–5.

* cited by examiner

TECHNIQUE AND APPARATUS FOR WAVE-MIXING FREQUENCY TRANSLATION IN A NETWORK

FIELD OF THE INVENTION

The present invention relates generally to wavelength-conversion, and more particularly, to a technique for implementing wavelength-interchanging cross-connect architectures with wave-mixing frequency translation devices.

BACKGROUND OF THE INVENTION

Wavelength-conversion is an important attribute of all-optical metropolitan area networks. Wave mixing enables cost-effective wavelength-conversion through bulk or band conversion, where many channels at distinct frequencies are simultaneously frequency-converted, in a common device. Two native forms of wave mixing are difference-frequency generation and four-wave mixing. For both forms of conversion, an incoming channel at frequency f is converted to an outgoing channel at frequency $(n-1)\pi-f$, where $\pi$ is the pump frequency, and n is the order of the wave-mixing process. For difference-frequency generation and four-wave mixing the order of the mixing process is respectively n=2, and n=3. It is possible to provide other non-native forms of wave-mixing frequency-conversion, with arrays of native wave-mixing devices. An example of non-native wave-mixing conversion is frequency-translation, where channels are frequency-shifted by a constant amount independent of the input channel frequency. Wave-mixing translation is achieved with two cascaded difference-frequency conversions that use different pump frequencies.

With wave mixing, it is possible to build non-blocking all-optical cross-connects that provide wavelength-conversion, with few converters. These architectures are usually multistage and comprise of many planes, and many stages of 2×2 space-switches.

A Twisted Benes architecture is based on a modification of a Benes architecture with difference-frequency converters. The Twisted Benes architecture is rearrangeable and uses O(FW) wave-mixing converters, where a given converter may simultaneously process up to O(W) channels. In Twisted Benes networks, for any connection, the worst case number of cascaded frequency-conversions is $O(\log_2 W)$.

Although it is based on bulk frequency-conversion, the Twisted Benes architecture has many limitations. First, it is only rearrangeable, implying that rerouting is needed at high load. Second, there is no cost-effective way to extend it with more planes into a strictly non-blocking network (e.g. into a Cantor network). Third, it does not offer any substantial reduction in the required number of wavelength-converters, when it is compared to more conventional designs with dedicated converters. Finally, in Twisted Benes networks, for a given connection, the worst case number of cascaded frequency-conversions of $O(\log_2 W)$ is large.

Other architectures of wave-mixing cross-connects have been proposed. These architectures are based on wave-mixing frequency-translation instead of difference-frequency generation. They enable the design of wave-mixing nodes with Benes, or any other multi-log topology. The converter requirements are between O(1) and O(F), per stage and per plane. With this architecture, it is possible to build strictly non-blocking networks with $O(F \log_2 W \log_2 (FW))$ wave-mixing converters (using a Cantor topology), instead of O(FW) wavelength-converters. However, like Twisted Benes networks, these binary wave-mixing translation networks are built with 2×2 elements. For this reason they are potentially limited by large impairments, given the worst-case number of cascaded frequency-conversions of $O(\log_2 W)$.

In view of the foregoing, it would be desirable to provide a technique for wave-mixing frequency translation which overcomes the above-described inadequacies and shortcomings. More particularly, it would be desirable to provide a technique for all-optical wavelength-conversion that uses wave-mixing frequency translation in an efficient and cost effective manner.

SUMMARY OF THE INVENTION

According to the present invention, a technique for selectively frequency translating channels in a system having W frequencies and one or more b×b switching elements is provided. In one particular exemplary embodiment, the technique may be realized as a method comprising selectively directing a channel operating at a respective one of the W frequencies based at least in part upon the respective frequency of the channel and shifting the respective frequency of the selectively directed channel by an amount defined by $\pm db^i \Delta f$, wherein d=0, 1, ..., b−1, $\Delta f$ is an optical frequency spacing between adjacent optical channels, and i=0, 1, ... $\log_b W−1$.

In accordance with further aspects of this particular exemplary embodiment of the present invention, wherein the channel is a first channel and the selectively directed channel is a first selectively directed channel, the technique may include selectively directing a second channel operating at another respective one of the W frequencies based at least in part upon the respective frequency of the second channel, wherein the respective frequency of the second selectively directed channel is the same as the respective frequency of the first selectively directed channel after it has been shifted.

In another particular exemplary embodiment, the inventive technique may be realized by a method for wave-mixing frequency translation in a network, comprising one or more stages, and one or more b×b switching elements connecting a number, F, of waveguides. The method may comprise selectively directing an incoming channel, incoming on a respective incoming waveguide $x_j$, operating at a frequency $f_i$, to an inter-stage connection module; and permuting the incoming channel to a respective outgoing waveguide $x_{j+d}$. The method may further comprise shifting the frequency $f_i$ by an amount defined by $f_{i-db^{s-\phi}}$, where s is an index of a stage of the one or more stages, $0 \leq j \leq (F-1)$, $d=y_{s-\phi}-z_0$, W is a number of frequencies per waveguide, $z_{\phi-1} \ldots z_0$ is the b-ary representation of j, $y_{\omega-1} \ldots y_0$ in the b-ary representation of i and $\phi = \log_b F$.

In accordance with further aspects of this particular exemplary embodiment of the present invention, wherein the incoming channel is a first channel and the selectively directed incoming channel is a first selectively directed incoming channel, the method may further include selectively directing a second incoming channel operating at another respective one of the W frequencies based at least in part upon the respective frequency of the second incoming channel, wherein the respective frequency of the second selectively directed incoming channel is the same as the respective frequency of the first selectively directed incoming channel after it has been shifted.

In another particular exemplary embodiment, the invention may be realized by an apparatus for selectively frequency translating channels in a system having W frequencies. The apparatus may comprise one or more b×b switching elements for selectively directing a channel operating at a respective one of the W frequencies based at least in part upon the respective frequency of the channel. The apparatus may also comprise one or more frequency devices for shifting the respective frequency of the selectively directed channel by an amount defined by $\pm db^i \Delta f$, wherein $d=0, 1, \ldots, b-1$, $\Delta f$ is an optical frequency spacing between adjacent optical channels, and $i=0, \ldots \log_b W-1$.

In accordance with further aspects of this particular exemplary embodiment of the present invention, wherein the channel is a first channel and the selectively directed channel is a first selectively directed channel, and wherein the one or more b×b switching elements selectively direct a second channel operating at another respective one of the W frequencies based at least in part upon the respective frequency of the second channel, the respective frequency of the second selectively directed channel is the same as the respective frequency of the first selectively directed channel after it has been shifted.

In another particular exemplary embodiment, the invention may be realized by an apparatus for wave-mixing frequency translation in a network, comprising one or more stages and a number, F, of waveguides. The apparatus may comprise one or more b×b switching elements that selectively direct an incoming channel, incoming on a respective incoming waveguide $x_j$, operating at a frequency $f_i$. The apparatus may also comprise an inter-stage connection module that permutes the incoming channel to a respective outgoing waveguide $x_{j+d}$. The apparatus may further comprise a frequency shifting device that shifts the frequency $f_i$ by an amount defined by $f_{i-db}{}^{s-\phi}$, where s is an index of a stage of the one or more stages, $0 \leq j \leq (F-1)$, $d=y_{s-\phi}-z_0$, W is a number of frequencies per waveguide, $z_{\phi-1} \ldots z_0$ is the b-ary representation of j, $y_{\omega-1} \ldots y_0$ in the b-ary representation of i and $\phi=\log_b F$.

In accordance with further aspects of this particular exemplary embodiment of the present invention, wherein the incoming channel is a first channel and the selectively directed incoming channel is a first selectively directed incoming channel, and wherein the one or more switching elements selectively directs a second incoming channel operating at another respective one of the W frequencies based at least in part upon the respective frequency of the second incoming channel, the respective frequency of the second selectively directed incoming channel is the same as the respective frequency of the first selectively directed incoming channel after it has been shifted.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
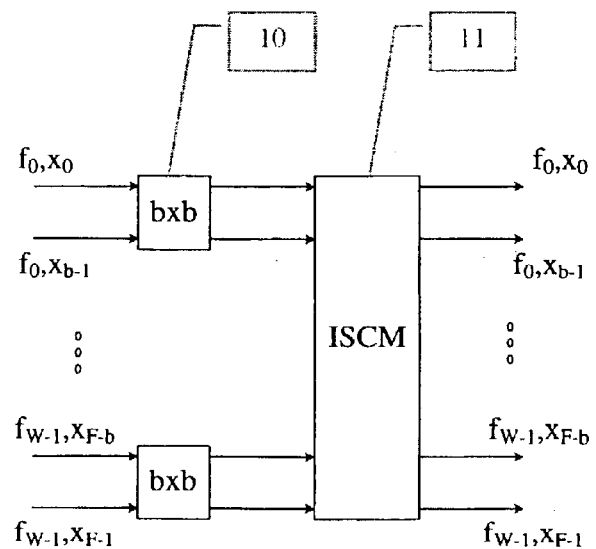
FIG. 1 is a representation of one stage of a proposed architecture in accordance with an embodiment of the present invention.

A general optical cross-connect may comprise F fibers and W optical frequencies per fiber. The frequencies may be regularly spaced and of the form $f_i=f_0+i\Delta f$, where $f_0$ is the base frequency and $\Delta f$ is the frequency spacing. For some integer $2 \leq b \leq F$, assume $F=b^\phi$, and $W=b^\omega$.

The invention implements a relatively simple design of non-blocking wave-mixing cross-connects with b×b space-switches. The basic idea of this technique is to implement arbitrary frequency-conversions, by cascaded frequency-translations, in amounts of the form $\pm lb^i \Delta f$, where $l=1, \ldots, (b-1)$, $i=0, \ldots, (\log_b W-1)$, and $\Delta f$ is the frequency spacing. In the construction, the elementary frequency-translations are provided with a small number (negligible compared to FW) of shared frequency translation devices. In other words, the technique leverages bulk wave-mixing frequency-conversion, and performs cascaded frequency-conversions on individual channels.

These solutions are two-dimensional higher-order multi-log networks that assign a channel with frequency $f_i$ from fiber $x_j$, to inlet or outlet $k=Fi+j$ at any stage. To implement inter-stage connection patterns, such as butterfly, shuffle or inverse-shuffle patterns, the obtained b-th order multi-log networks require static (i.e., the inter-stage frequency-conversions do not change according to the network state) wavelength-selective frequency-conversions. One advantage of the new solutions is that the selected assignment of channels to switch inlets and outlets enables the building of butterfly permutations, with a constant number of wave-mixing converters. These solutions also apply to b-th order multicast multi-log networks with b×b multicast switching elements. The following sections give an overview of multi-log networks and a detailed description of the new architectures.

Multi-log networks form an important class of multi-stage networks. These interconnection networks usually comprise several identical planes, where each plane has many consecutive stages of switching elements. These stages are interconnected by specific patterns based on butterfly, shuffle or inverse-shuffle permutations. The characteristics of an arbitrary order multi-log network are usually given by an expression of the form $\log_b(N,m,p)$, where b is the size of the switching elements, N is the size of the network (i.e. the number of inputs or outputs), m is the number of additional stages, and p is the number of identical planes. A b-th order multi-log network may be self-routing (SR), rearrangeably non-blocking (RNB) or strictly non-blocking (SNB), according to specific quantitative relations between the three parameters (N, m, and p) describing the network. These conditions are usually expressed by a required number of planes for a given level of non-blocking operation.

Wavelength-interchanging cross-connects are an example of multi-divisional switches. In such cross-connects, the assignment of channels to inlets and outlets is critical. The assignment of channels is described in detail below.

A given wavelength division multiplexing (WDM) system may comprise $F=b^\phi$ fibers labeled $x_j$ where $0 \leq j \leq (F-1)$, and $W=b^\omega$ optical frequencies of the form $f_i=f_0+i\Delta f$, where $0 \leq i \leq (W-1)$. A given channel is denoted by a pair of the form $(f_i,x_j)$, where $f_i$ is the optical frequency of the channel and $x_j$ is the fiber of the channel. Some inlet or outlet k with b-ary representation $k_{\phi+\omega-1} \ldots k_0$ may be assigned the channel with frequency $f_i$ on fiber $x_j$, where $k_{\phi+\omega-1} \ldots k_\phi$ is the unsigned b-ary representation of i, and $k_{\phi-1} \ldots k_0$ is the unsigned b-ary representation of j. This labeling can also be described as assigning a channel with frequency $f_i$ on fiber $x_j$ to inlet/outlet $k=iF+j$. When considering b-ary interconnection networks (i.e. networks built with b×b elements), the above labeling guarantees that switching elements are simply space-switches.

FIG. 1 represents one stage of the proposed architecture, where b×b space switching elements, such as 10, connect to the next stage, through an inter-stage connection module 11. The function of this latter module is to provide wavelength-conversion and basic inter-stage connection patterns including butterfly, shuffle and inverse-shuffle patterns. Cost-effective implementations of the inter-stage connections with wave-mixing translations are described below.

Multi-log networks are based on three fundamental inter-stage permutations: butterfly, shuffle or inverse-shuffle. For these permutations, assignment of channels to inlets and outlets may require wavelength-conversion between switching stages. The use of wave mixing enables the construction of butterfly, and shuffle (or inverse shuffle) permutations, respectively with O(F) and O(F $\log_b$ W) converters. For a clearer description of the solutions, denote by $y_{\omega-1} \ldots y_0 z_{\phi-1} \ldots z_0$ the b-ary representation of an inlet or outlet k, which is assigned the channel with frequency $f_i$ on fiber $x_j$; $y_{\omega-1} \ldots y_0$ being the b-ary representation of i and $z_{\phi-1} \ldots z_0$ the b-ary representation of j.

A b-th order butterfly permutation $\beta_s$ is defined as the mapping of an outlet from a given stage into an inlet of the next stage, where the b-ary representation of the next-stage inlet index is obtained by simply swapping the least significant digit, and the (s+1)-th least significant digit, in the b-ary representation of the current-stage outlet index. This can be implement by an arbitrary butterfly permutation $\beta_s$ (where $0 \leq s \leq \phi+\omega-1$) as follows.

If $s<\phi$: the inter-stage connection only involves a spatial permutation of fiber channels. In the permutation all incoming wavelength channels on some fiber $x_i$ are routed to some outgoing fiber $x_j$, where $j=i-(z_s-z_0(b^s-1))$. Otherwise ($\phi \leq s < \phi+\omega-1$): a channel with frequency $f_i$ on incoming fiber $x_j$ is directed to fiber $x_{j+d}$ and shifted to frequency $f_{i-db^{s-\phi}}$, where $d=y_{s-\phi}-z_0$.

Figure 2:
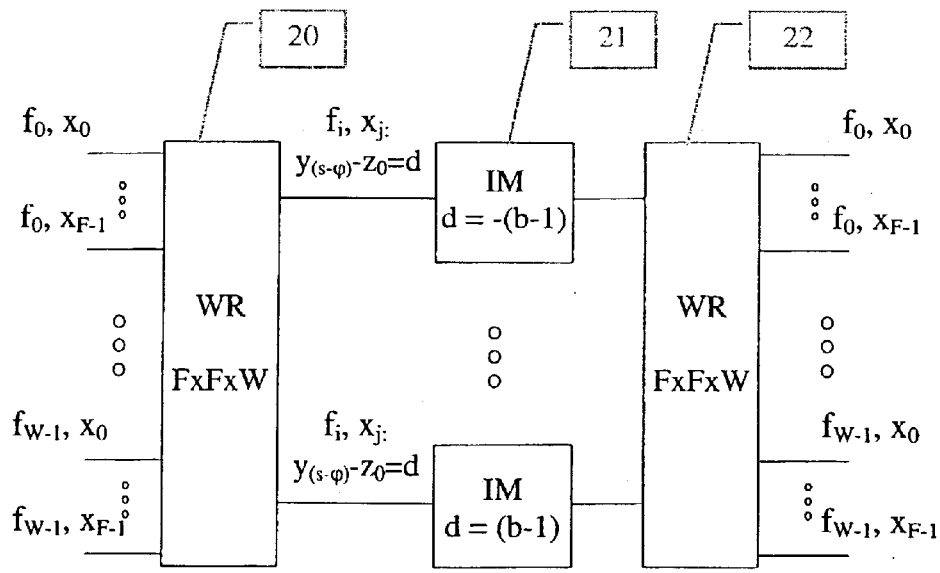
FIG. 2 is an illustration of a butterfly module in accordance with an embodiment of the present invention.
Figure 3:
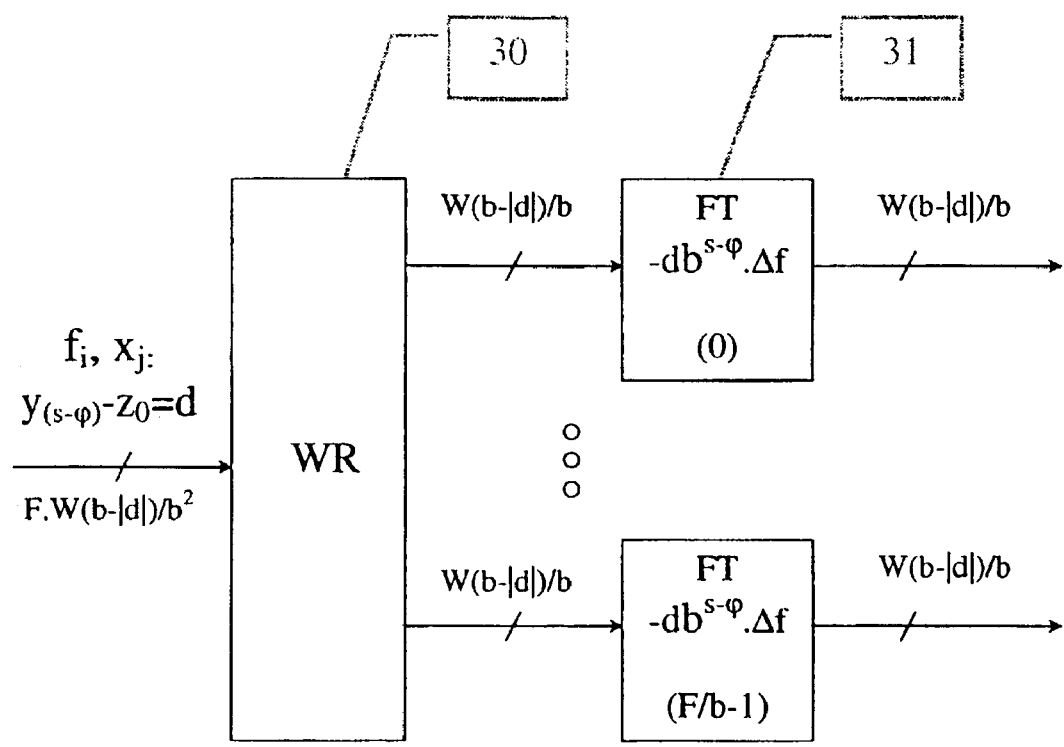
FIG. 3 is an illustration of an internal design of an intermediate module in accordance with an embodiment of the present invention.

The internal design of a b-th order butterfly module is represented in FIG. 2 and FIG. 3. As mentioned above, the internal architecture of a butterfly module $\beta_s$ depends on the relative value of s, with respect to $\phi$, where $\phi=\log_b F$, and F is the total number of fibers in the system.

FIG. 2 shows a butterfly module $\beta_s$, when $s \geq \phi$. In this case a static wavelength router 20 directs incoming channels to one of (2b-1) intermediate modules 21, where each intermediate module takes FW(b-|d|)/b² inputs of the form $f_i,x_j$), where $y_{s-\phi}-z_0=d$, and $-(b-1) \leq d \leq (b-1)$ is characteristic of the intermediate module. From the intermediate modules the wavelength-channels are directed to a second wavelength-router 22, and to inlets of next stage switching elements. In the first wavelength-router 20, channels are directed to an intermediate module 21 according to $y_{s-\phi}-z_0$, (i.e. according to the frequency and to the fiber of the channel at the input of the butterfly inter-stage connection module). In the second wavelength-router 22, a channel coming from one of the intermediate modules is directed to output $(f_{i-db^{s-\phi}}, x_{j+d})$ of the inter-stage connection module, where $d=y_{s-\phi}-z_0$ (i.e., the channel is routed according to the frequency and the fiber of the channel at the input of the inter-stage connection module).

FIG. 3 shows the internal design of an intermediate module (IM). A total of FW(b-|d|)/b² wavelength-channels are sent to a given intermediate module. They all satisfy a relation of the form $y_{s-\phi}-z_0=d$, where d is a constant for a given intermediate module ($-(b-1) \leq d \leq (b-1)$). Within an intermediate module, the channels are first directed to a first wavelength-router 30 that groups the channels into F/b distinct groups of W(b-|d|)/b channels at one of W(b-|d|)/b distinct optical frequencies (i.e., within a given group, channels have distinct frequencies). At the output of the wavelength-router 30, all channels within a given group are directed to one of F/b bulk wave-mixing frequency-translation modules 31, which provide a frequency-translation by $-db^{s-\phi} \cdot \Delta f$ and then directs the channels to outputs of the intermediate module. Note that when d=0, no frequency-translation is needed, and therefore neither the wavelength-router 30 nor the frequency-translation modules 31 are required.

When $s<\phi$, the butterfly inter-stage connection is simply provided by a static wavelength-router that directs channels as follows.

If $z_s=z_0$, channel $(f_i,x_j)$ is mapped to $(f_i,x_j)$. Otherwise channel $(f_i,x_j)$ is switched to channel $(f_i,x_{j-(b^s-1)(z_s-z_0)})$.

When $0<s<\phi$, a b-th order butterfly permutation requires no wave-mixing converter. When $\phi \leq s \leq \phi+\omega-1$, the inter-stage connection module contains (2b-2) wavelength-converting intermediate modules, each with F/b wave-mixing converters. Therefore, an inter-stage connection module requires 2F(b-1)/b (i.e. O(F)) frequency-translation devices, when $\phi \leq s \leq \phi+\omega-1$. In each butterfly permutation a given channel undergoes at most one frequency-conversion. The worst-case number of frequency-conversions affecting a given channel is O(1), within a butterfly inter-stage connection module.

Shuffles and inverse shuffles are also key permutations for the construction of multi-log networks. Like butterfly permutations, they can be easily described in terms of digit permutations on the b-ary representation of inlets and outlets. For a given $0<h \leq \phi+\omega-1$, the shuffle permutation $\delta_h$ does a left-to-right circular permutation of the h+1 least significant digits of the b-ary representation of outlets. For a given $0<h \leq \phi+w-1$, the inverse shuffle permutation $\sigma^{-1}_h$ does a right-to-left circular permutation of the h+1 least significant digits of the b-ary representation of outlets.

In the present case, for a given $0<s<\phi$, a shuffle $\sigma_s$ (or inverse-shuffle $\sigma_s^{-1}$) permutation reduces to a cyclic wavelength-routing operation. Otherwise it requires wavelength-selective frequency-conversions. When $s \geq \phi$, a shuffle or inverse shuffle inter-stage connection can be built with O(F $\log_b$ W) wave-mixing frequency-converters, using a statically configured rearrangeable $\log_b(FW,\phi+\omega-1,1)$ network, with butterfly permutations implemented as described above. This $\log_b(FW,\phi+\omega-1,1)$ is in fact a horizontally extended version of the Banyan topology, where the worst-case number of cascaded frequency-conversion is $2\log_b$ W. With this technique the converter requirements of a shuffle or inverse-shuffle permutation is O(F $\log_b$ W), while for any connection, the number of cascaded frequency-conversions is at most O($\log_b$ W).

The architecture described in FIG. 1 can also support multicast connections, when the b×b switching elements have multicast capabilities. However, no change is required regarding inter-stage connection modules (ISCMs).

As noted above, the invention provides a simple construction of multi-log wavelength-interchanging cross-connects with arbitrary b×b space-switches, where $2 \leq b \leq F$. The invention exploits bulk wave-mixing frequency-translation and extends the traditional framework of multi-log networks by considering a specific assignment of wavelength channels to inlets and outlets. This assignment is such that an inlet or outlet k is assigned the channel with frequency $f_i$ on fiber $x_j$, where $i = \lfloor k/F \rfloor$, and $j = k \bmod F$. In the above-described architectures, a given connection goes through a worst-case number of cascaded frequency-conversions of $O(\log_b W)$. For these designs, the converter requirements are between $O(F)$ and $O(F \log_b W)$, per stage and per plane. The inventive method also extends to multicast networks with multicast b×b space-switches.

In summary, the invention provides wave-mixing cross-connects with higher order multi-log topologies. The topologies comprise many planes and of many stages of b×b space-switches, where b is an integer smaller than the number of fibers. W denotes the number of wavelengths per fiber, and F the number of fibers. In the inventive networks, wavelength-conversions occur only between stages. The conversions are wavelength-selective and use one or more frequency-translations in amounts of the form $\pm lb^k \Delta f$, where $0 \leq l \leq (b-1)$, $0 \leq k \leq (\log_b W - 1)$ and $\Delta f$ is the frequency spacing. With these inventive designs, the required number of wave-mixing converters is between $O(F)$ and $O(F \log_b W)$ per plane and per stage. Also for any connection, the worst-case number of cascaded conversions is between $O(\log_b W)$ and $O(\{\log_b W\}^2)$. The maximum benefits are obtained when the number of fibers F and the number of wavelengths have the same order of magnitude, (i.e., $F = O(W)$). In this case, a choice of $b = F$ leads to a worst-case number of cascaded frequency-conversions of $O(1)$, and wave-mixing converter requirements of $O(F)$ for the overall cross-connect (including all the stages and all the planes). The inventive networks also support multicast connections if the b×b space-switching elements provide multicast.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for selectively frequency translating channels in a system having W frequencies, and one or more b×b switching elements, the method comprising the steps of:

selectively directing a channel operating at a respective one of the W frequencies based at least in part upon the respective frequency of the channel; and shifting the respective frequency of the selectively directed channel by an amount defined by $\pm db^i \Delta f$, wherein $d = 0, 1, \ldots, b-1$, $\Delta f$ is an optical frequency spacing between adjacent optical channels, and $i = 0, 1, \ldots \log_b W - 1$.

2. The method as defined in claim 1, wherein the channel is a first channel and the selectively directed channel is a first selectively directed channel, further comprising the step of:

selectively directing a second channel operating at another respective one of the W frequencies based at least in part upon the respective frequency of the second channel, wherein the respective frequency of the second selectively directed channel is the same as the respective frequency of the first selectively directed channel after it has been shifted.

3. A method for wave-mixing frequency translation in a network, comprising one or more stages, and one or more b×b switching elements connecting a number, F, of waveguides the method comprising:

selectively directing an incoming channel, incoming on a respective incoming waveguide $x_j$, operating at a frequency $f_i$, to an inter-stage connection module; and permuting the incoming channel to a respective outgoing waveguide $x_{j+d}$; and shifting the frequency $f_i$ by an amount defined by $f_{i-db}^{s-\phi}$, where s is an index of a stage of the one or more stages, $0 \leq j \leq (F-1)$, $d = y_{s-\phi} - z_0$, W is a number of frequencies per waveguide, $z_{\phi-1} \ldots z_0$ is the b-ary representation of j, $y_{\omega-1} \ldots y_0$ in the b-ary representation of i and $\phi = \log_b F$ and $\omega = \log_b W$.

4. The method as defined in claim 3, wherein the incoming channel is a first channel and the selectively directed incoming channel is a first selectively directed incoming channel, further comprising the step of:

selectively directing a second incoming channel operating at another respective one of the W frequencies based at least in part upon the respective frequency of the second incoming channel, wherein the respective frequency of the second selectively directed incoming channel is the same as the respective frequency of the first selectively directed incoming channel after it has been shifted.

5. An apparatus for selectively frequency translating channels in a system having W frequencies the apparatus comprising:

one or more b×b switching elements for selectively directing a channel operating at a respective one of the W frequencies based at least in part upon the respective frequency of the channel; and one or more frequency devices for shifting the respective frequency of the selectively directed channel by an amount defined by $\pm db^i \Delta f$, wherein $d = 0, 1, \ldots, b-1$, $\Delta f$ is an optical frequency spacing between adjacent optical channels, and $i = 0, \ldots, \log_b W - 1$.

6. The apparatus as defined in claim 5, wherein the channel is a first channel and the selectively directed channel is a first selectively directed channel, and wherein the one or more b×b switching elements selectively direct a second channel operating at another respective one of the W frequencies based at least in part upon the respective frequency of the second channel, and wherein the respective frequency of the second selectively directed channel is the same as the respective frequency of the first selectively directed channel after it has been shifted.

7. An apparatus for wave-mixing frequency translation in a network, comprising one or more stages and a number, F, of waveguides the apparatus comprising:

one or more b×b switching elements that selectively direct an incoming channel, incoming on a respective incoming waveguide $x_j$, operating at a frequency $f_i$;

an inter-stage connection module that permutes the incoming channel to a respective outgoing waveguide $x_{j+d}$; and a frequency shifting device that shifts the frequency $f_i$ by an amount defined by $f_{i-db^{s-\phi}}$, where s is an index of a stage of the one or more stages, $0 \leq j \leq (F-1)$, $d=y_{s-\phi}-z_0$, W is a number of frequencies per waveguide, $z_{\phi-1} \ldots z_0$ is the b-ary representation of j, $y_{\omega-1} \ldots y_0$ in the b-ary representation of i and $\phi=\log_b F$ and $\omega=\log_b W$.

8. The apparatus as defined in claim 7, wherein the incoming channel is a first channel and the selectively directed incoming channel is a first selectively directed incoming channel, and wherein the one or more switching elements selectively directs a second incoming channel operating at another respective one of the W frequencies based at least in part upon the respective frequency of the second incoming channel, wherein the respective frequency of the second selectively directed incoming channel is the same as the respective frequency of the first selectively directed incoming channel after it has been shifted.

* * * * *